US010685289B2

(12) United States Patent
Natroshvili

(10) Patent No.: US 10,685,289 B2
(45) Date of Patent: Jun. 16, 2020

(54) TECHNIQUES FOR IMPROVING CLASSIFICATION PERFORMANCE IN SUPERVISED LEARNING

(71) Applicant: INTEL CORPORATION, Santa Clara, CA (US)

(72) Inventor: Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 14/731,479

(22) Filed: Jun. 5, 2015

(65) Prior Publication Data

US 2016/0358100 A1 Dec. 8, 2016

(51) Int. Cl.
*G06F 15/18* (2006.01)
*G06N 20/00* (2019.01)

(52) U.S. Cl.
CPC ................... *G06N 20/00* (2019.01)

(58) Field of Classification Search
CPC ..................................................... G06N 99/005
See application file for complete search history.

(56) References Cited

U.S. PATENT DOCUMENTS 6,134,344 A * 10/2000 Burges ................. G06K 9/6269
382/155
7,461,063 B1 * 12/2008 Rios ........................ G06F 17/18
707/999.104
7,533,076 B2 * 5/2009 Harris .................. G06K 9/6269
706/12
2009/0274376 A1 * 11/2009 Selvaraj ............. G06K 9/00442
382/224
2010/0070440 A1 * 3/2010 Nguyen ............... G06N 99/005
706/12

(Continued)

FOREIGN PATENT DOCUMENTS

EP 2442258 A1 4/2012

OTHER PUBLICATIONS

C. Burges, "Simplified Support Vector Decision Rules," Proceedings of the 13th International Conference on Machine Learning (ICML 1996), pp. 71-77, Bari, Italy, 1996 (7 pages).

(Continued)

*Primary Examiner* — Luis A Sitiriche
(74) *Attorney, Agent, or Firm* — Finch & Maloney PLLC

(57) ABSTRACT

Techniques are disclosed for improving classification performance in supervised learning. In accordance with some embodiments, a multiclass support vector machine (SVM) having three or more classes may be converted to a plurality of binary problems that then may be reduced via one or more reduced-set methods. The resultant reduced-set (RS) vectors may be combined together in one or more joint lists, along with the original support vectors (SVs) of the different binary classes. Each binary problem may be re-trained using the joint list(s) by applying a reduction factor (RF) parameter to reduce the total quantity of RS vectors. In re-training, different kernel methods can be combined, in accordance with some embodiments. Reduction may be performed until desired classification performance is achieved. The disclosed techniques can be used, for example, to improve classification speed, accuracy, class prioritization, or a combination thereof, in the SVM training phase, in accordance with some embodiments.

22 Claims, 9 Drawing Sheets

(56) References Cited

U.S. PATENT DOCUMENTS

2015/0160128 A1\* 6/2015 Liu .................. G01N 21/55
356/445
2015/0339288 A1\* 11/2015 Baker ................ G06F 17/2705
704/9

OTHER PUBLICATIONS

K. Natroshvili et al., "Real Time Pedestrian Detection by Fusing PMD and CMOS Cameras," 2008 IEEE Intelligent Vehicles Symposium, pp. 925-929, Eindhoven, The Netherlands, Jun. 4-6, 2008 (5 pages).

C. Papageorgiou et al., "A Trainable Pedestrian Detection System," Proceedings of IEEE International Conference on Intelligent Vehicles, Stuttgart, Germany, Oct. 1998 (6 pages).

B. Tang et al., "Multiclass Reduced-Set Support Vector Machines," Proceedings of the 23rd International Conference on Machine Learning (ICML 2006), pp. 921-928, Pittsburgh, PA, 2006 (8 pages).

C. Burges, "A Tutorial on Support Vector Machines for Pattern Recognition," Data Mining and Knowledge Discovery, vol. 2, Issue 2, pp. 121-167, Kluwer Academic Publishers, Boston, MA, Jun. 1998 (43 pages).

\* cited by examiner

Figure 3A
Figure 3B
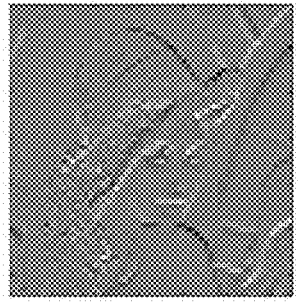
Figure 3C
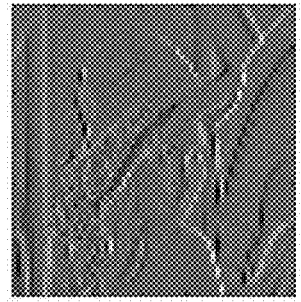
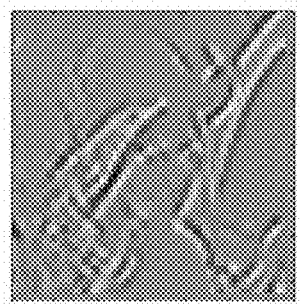
Figure 3D
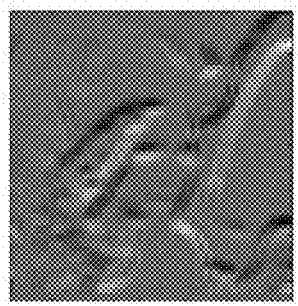
Figure 3E
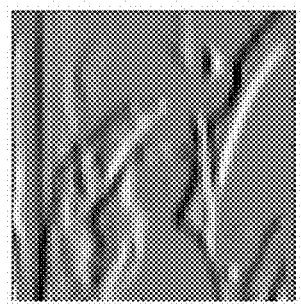
Figure 3F

TECHNIQUES FOR IMPROVING CLASSIFICATION PERFORMANCE IN SUPERVISED LEARNING

BACKGROUND

A support vector machine (SVM) is a supervised learning model that may be used in machine learning. Typically, an SVM is associated with one or more learning processes (e.g., learning algorithms) that provide data analysis and pattern recognition. SVMs can be used, for example, in classification and regression analysis, among other tasks in statistical analysis. Binary SVMs have two statistical classes, whereas multiclass SVMs have three or more statistical classes. In any case, an SVM may be used in analyzing a given set of training examples, each such example designated as being a constituent of a given particular statistical class. From the results of its analysis, the SVM may build a model file by which new examples may be assigned into a given class.

BRIEF DESCRIPTION OF THE DRAWINGS

FIG. 3A is an example standard test image.

FIGS. 3B-3C illustrate the results of processing the example test image of FIG. 3A with a classical Haar 2D DWT.

FIGS. 3D-3F illustrate the results of processing the example test image of FIG. 3A with a QH 2D DWT.

DETAILED DESCRIPTION

Figure 1:
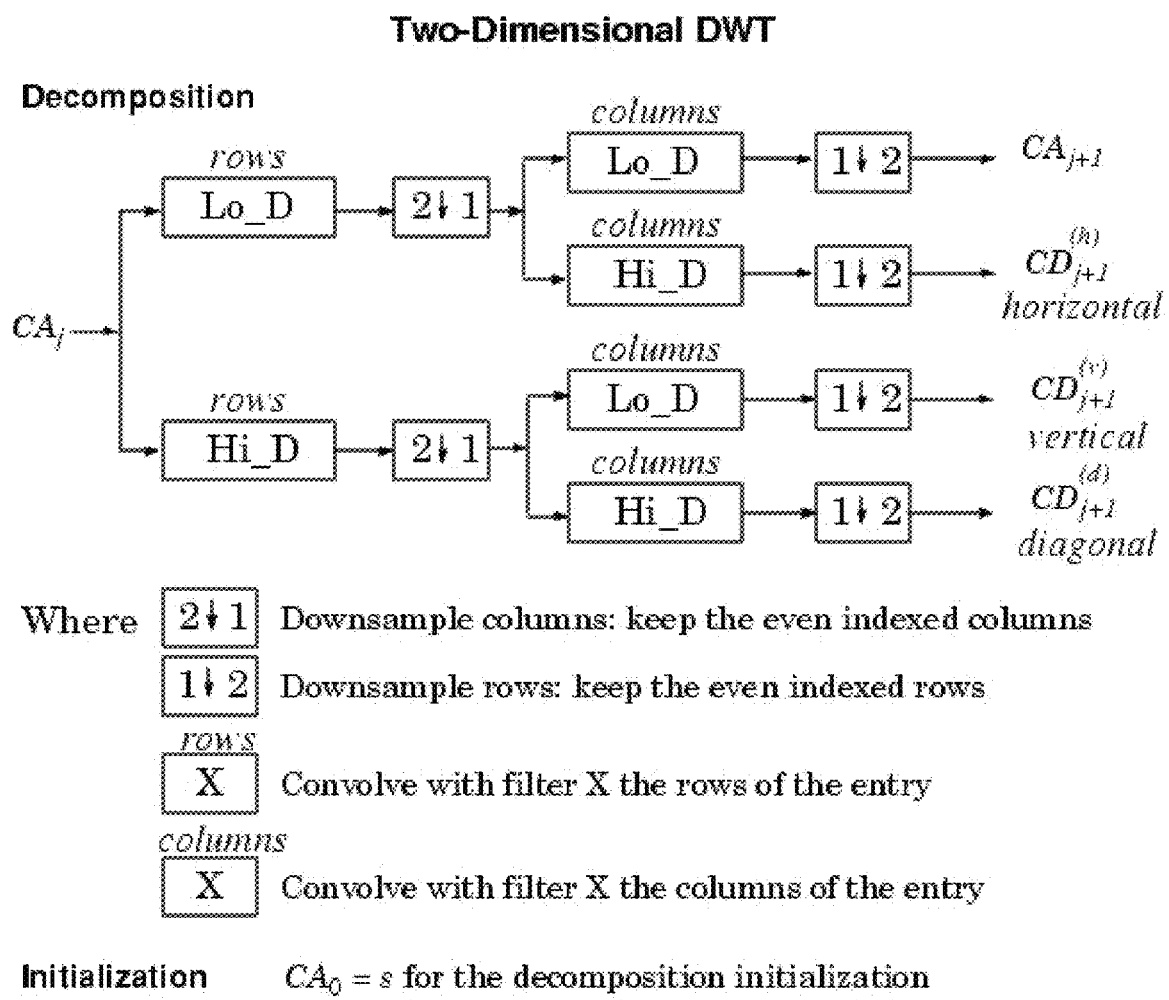
FIG. 1 illustrates an implementation of a classical Haar two-dimensional discrete wavelet transform (2D DWT).

Techniques are disclosed for improving classification performance in supervised learning. In accordance with some embodiments, a multiclass support vector machine (SVM) having three or more classes may be converted to a plurality of binary problems, each having only two classes, that then may be reduced via one or more reduced-set methods. The resultant reduced-set (RS) vectors may be combined together in one or more joint lists, along with the original support vectors (SVs) of the different binary classes. Each binary problem then may be re-trained using the one or more joint lists by applying a reduction factor (RF) parameter to reduce the total quantity of RS vectors. In re-training, different kernel methods can be combined, in accordance with some embodiments. Reduction may be performed until desired multiclass SVM classification performance is achieved. The disclosed techniques can be used, for example, to improve classification speed, accuracy, class prioritization, or a combination thereof, in the SVM training phase, in accordance with some embodiments. Numerous configurations and variations will be apparent in light of this disclosure.

GENERAL OVERVIEW

In supervised learning, a greater quantity of training examples typically improves the classification results of a support vector machine (SVM). However, this larger amount of training data also increases classification time in the testing phase of an SVM, resulting in complications for real-time implementations.

Thus, and in accordance with some embodiments of the present disclosure, techniques are disclosed for improving classification performance in supervised learning. In accordance with some embodiments, a multiclass support vector machine (SVM) having three or more classes may be converted to a plurality of binary problems, each having only two classes. To such end, the multiclass SVM may undergo, for example, one-vs.-all (OvA; one-against-all; one-against-rest) reduction or one-vs.-one (OvO; one-against-one) reduction. Each binary problem then may be reduced via one or more reduced-set methods. For instance, reduction may be performed, in accordance with an embodiment, using the Burges reduced-set vector method (BRSM or BRSVM), which applies a polynomial kernel function. In accordance with another embodiment, reduction may be performed, for instance, using the Gaussian reduced-set vector method (GRSM or GRSVM), which applies a Gaussian kernel function, such as the Gaussian radial basis function (RBF). It should be noted, however, that the present disclosure is not so limited only to these example reduction methods and kernels, as in a more general sense, and in accordance with some embodiments, any reduced-set methods (and associated kernels) may be utilized, as desired for a given target application or end-use. In some instances, a user-defined (or otherwise user-configurable) kernel function may be applied, in accordance with an embodiment.

The resultant reduced-set (RS) vectors may be combined together in one or more joint lists. In accordance with some embodiments, the RS vectors may be combined in a single joint list, along with the original support vectors (SVs) of the different binary classes. In accordance with some other embodiments, multiple joint lists may be generated, each containing only the resultant RS vectors corresponding to a single applied kernel that they share in common, along with the original SVs of the different binary classes. Thus, for this latter case, if both the BRSM and GRSM are applied, for example, then a first joint list may contain RS vectors resulting only from the polynomial kernel applied in the BRSM, whereas a second joint list may contain RS vectors resulting only from the Gaussian kernel applied in the GRSM. Additional or different joint lists, produced by additional or different applied kernels, may be provided, in accordance with other embodiments.

In accordance with some embodiments, each binary problem may be re-trained using the one or more joint lists. In the re-training phase, different kernels can be combined, in accordance with some embodiments. During re-training, one or more reduction factor (RF) parameters may be applied to reduce the total quantity of RS vectors. A given RF parameter to be applied may be selected, in part or in whole, based on the particular SVM performance enhancement to be achieved. For instance, some RF parameters may serve to control classification time, whereas others may serve to control classification accuracy, priority, or other performance. Some RF parameters may give priority to a given binary problem over another binary problem. Some RF parameters may give priority to a given kernel method as compared to another kernel method. Some RF parameters may control which RS vectors and original SVs enter a given joint list. Some RF parameters may control which re-trained vectors will participate in the final decisions of the SVM. In some cases, a given RF parameter may provide a combination of any one or more of the aforementioned. Numerous suitable RF parameters will be apparent in light of this disclosure and selection may be customized, as desired for a given target application or end-use. In re-training, reduction via the one or more RF parameters may be performed until the multiclass SVM classification performance desired for a given target application or end-use is achieved.

In accordance with some embodiments, the disclosed techniques can be used, for example, to improve the classification speed of a multiclass SVM in its testing phase. As will be appreciated in light of this disclosure, for a multiclass SVM, most of the processing time in the testing phase is typically associated with calculations involved in applying kernel functions (e.g., from scalar multiplication of multiple vectors). In using the disclosed techniques, however, all binary problems may be combined within the same joint list or plurality of joint lists, in accordance with some embodiments, which may be calculated only once for all classes, reducing the total calculation time. In some cases, the disclosed techniques may be utilized, for example, to speed up SVM classification in multiclass cases (e.g., having three or more classes) by a factor of 50 or less (e.g., 40 or less, 30 or less, 20 or less, or any other sub-range in the range of 50 or less). In some instances, a multiclass SVM may be sufficiently speeded up via the disclosed techniques for use in real-time applications, such as, for example, real-time pedestrian and hazard detection for automobile driver assistance systems.

It should be noted, however, that the disclosed techniques are not so limited only to use in multiclass classification (e.g., three or more classes), as techniques disclosed herein can be used in binary classification (e.g., two classes) as well, in accordance with some embodiments. For instance, in some cases, the disclosed techniques may be utilized to speed up SVM classification in binary cases (e.g., having two classes) by a factor of 100 or less (e.g., 80 or less, 60 or less, or any other sub-range in the range of 100 or less). It should be further noted that a joint list provided as described herein may have a greater quantity of vectors than the original binary problem, thus providing for greater classification freedom. This greater classification freedom can be used, for instance, to optimize or otherwise customize the classification performance (e.g., class detection) of a multiclass SVM for a given problem of interest, in accordance with some embodiments. It should be further noted that the disclosed techniques are not so limited only to use in SVMs, as in a more general sense, and in accordance with some embodiments, they can be utilized in any suitable supervised learning method, as will be apparent in light of this disclosure.

In accordance with some embodiments, the disclosed techniques can be used, for example, in image processing. More particularly, classification using a multiclass SVM may be speeded up or otherwise improved by combining a quadruple Haar two-dimensional discrete wavelet transformation (QH 2D DWT) with one or more reduced-set methods, as described herein, in accordance with some embodiments. It should be noted, however, that although the disclosed techniques are primarily discussed and demonstrated in the example context of classification in an image processing application using Haar types of features (which are denser than classical features and can be used in image classifications), the present disclosure is not so limited. In a more general sense, the disclosed techniques can be used in any of a wide range of fields, including, for example, audio signal analysis or any other case where there is use of numerical analysis or the testing or training of a multiclass SVM, in accordance with some embodiments. Numerous suitable uses and applications will be apparent in light of this disclosure.

Methodology

Figure 2:
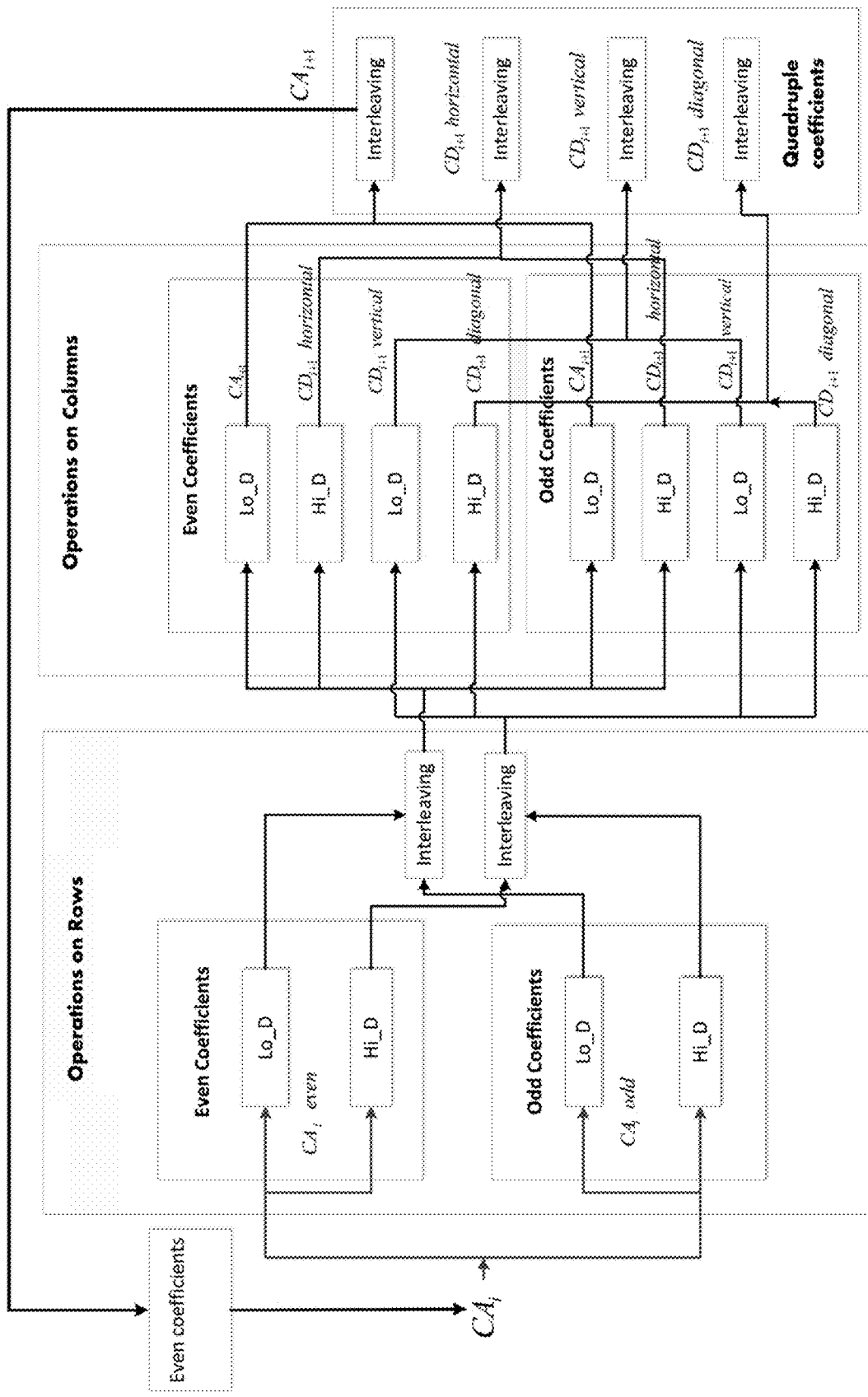
FIG. 2 illustrates one level of a quadruple Haar two-dimensional discrete wavelet transformation (QH 2D DWT).

Wavelet transformations are often used in image processing to provide the gradient type of information for the different scales of images. In particular, Haar wavelets provide intensity differences of an image in different directions at different scales (resolutions). FIG. 1 illustrates an implementation of a classical Haar two-dimensional discrete wavelet transform (2D DWT). As shown, two filters are used in a classical Haar 2D DWT. After processing each level, the result is downscaled (downsampled) by 2. In a quadruple Haar two-dimensional discrete wavelet transformation (QH 2D DWT), however, the even and the odd lines and columns are processed separately, and the results are interleaved as generally shown via FIGS. 3D-3F (discussed below). For example, consider FIG. 2, which illustrates one level of a QH 2D DWT. Here, instead of downscaling in the next level of the transform, either even or odd values are transferred. In this manner, the number of the transformation coefficients decreases, while keeping the results sufficiently dense for further processing.

FIG. 3A is an example standard test image (e.g., the so-called 'Lena image' typically used in the field of image processing). FIGS. 3B-3C illustrate the results of processing the example test image of FIG. 3A with a classical Haar 2D DWT. In more detail, FIGS. 3B and 3C are, respectively, the horizontal and vertical 2D DWT of the test image of FIG. 3A. FIGS. 3D-3F illustrate the results of processing the example test image of FIG. 3A with a QH 2D DWT. In more detail, FIGS. 3D and 3E are, respectively, the horizontal and vertical QH 2D DWT of the test image of FIG. 3A. FIG. 3F is the interleaving of the results of the horizontal and vertical QH 2D DWT of FIGS. 3D and 3E, respectively. As can be seen from these figures, the QH 2D DWT yields a denser representation than the classical Haar 2D DWT.

A typical support vector machine (SVM) is based on structural risk minimization and creates the hyperplane that optimally (or otherwise desirably) separates two classes. SVM results are often compared with those of neural networks, but SVMs have more robust theory and produce more general solution results than neural networks. In particular, SVM results normally converge to a global minimum, which is not always the case for neural networks. The SVM decision function for the testing phase is:

$$f(x) = \text{sgn}\left(\sum_{i=1}^{N_s} y_i \alpha_i K(x, s_i) + b\right), \quad \text{Eq. (1)}$$

where:
(a) $N_s$ is the quantity of support vectors (SVs);
(b) $y_i$ are the class labels, which, in the case of two classes, can receive −1, 1 values;
(c) $\alpha_i$ are the weights of the SVs;
(d) $K(x,s_i)$ is the kernel function;
(e) x is the vector to be classified;
(f) $s_i$ are the SVs, which are selected from training examples in the training phase and normally are mostly close to the decision boundary; and
(g) b is the parameter.

In an SVM, the so-called kernel trick (i.e., kernel method for pattern analysis) may be used, wherein the applied kernel function converts the vector manipulations to the scalar. An SVM can use any typical kernel function such as, for example, polynomial, radial, and sigmoid kernels, among others. Alternatively, or additionally, an SVM can use a user-defined (or otherwise user-configurable) kernel function.

Reduced-set methods can be used to calculate vectors, which may or may not necessarily be SVs, and try to substitute the original decision hyperplane. The reduced-set (RS) vectors resulting from application of a reduced-set method may appear in the same way like the original SVs in the decision function, but are not training examples and therefore are not SVs. The decision function using the RS vectors is as follows:

$$f_{RedSet}(x) = \sum_{i=1}^{N_z} y_i \alpha_i^{RedSet} K(x, z_i) + b, \qquad \text{Eq. (2)}$$

where:
(a) $z_i$ are the reduced-set (RS) vectors; and
(b) $\alpha^{RedSet}_i$ are the coefficients for the RS vectors.

Thus, if one has the following vector:

$$\Psi = \sum_{i=1}^{N_s} \alpha_i \Phi(s_i) \qquad \text{Eq. (3)}$$

and tries to approximate the following:

$$\Psi' = \sum_{i=1}^{N_z} \alpha_i^{RedSet} \Phi(z_i), \qquad \text{Eq. (4)}$$

then in the reduced-set method, the distance may be minimized according to the following:

$$\|\Psi - \Psi'\|^2 = \sum_{i,j=1}^{N_s} \alpha_i \alpha_j K(s_i, z_j) + \qquad \text{Eq. (5)}$$
$$\sum_{i,j=1}^{N_z} \alpha_i^{RedSet} \alpha_j^{RedSet} K(z_i, z_j) - 2 \sum_{i=1}^{N_s} \sum_{j=1}^{N_z} \alpha_i \alpha_j^{RedSet} K(s_i, z_j).$$

As previously noted, different kernels can be used in an SVM. For applications of a reduced-set method employing a Gaussian function, such as the Gaussian radial basis function (RBF), the kernel may look like the following:

$$K(x_i, x_j) = e^{-\alpha \|x_i - x_j\|^2}. \qquad \text{Eq. (6)}$$

The RS vectors can be calculated in the following manner:

$$z = \frac{\sum_{i=1}^{N_s} \alpha_i e^{\frac{-\|s_i - z\|^2}{2\sigma^2}} s_i}{\sum_{i=1}^{N_s} \alpha_i e^{\frac{-\|s_i - z\|^2}{2\sigma^2}}}. \qquad \text{Eq. (7)}$$

After reduction, the remaining RS vectors can be estimated in an iterative manner via the Gaussian reduced-set vector method (GRSM or GRSVM), provided here:

$$z_{n+1} = \frac{\sum_{i=1}^{N_z} \alpha_i e^{\frac{-\|s_i - z_n\|^2}{2\sigma^2}} s_i}{\sum_{i=1}^{N_z} \alpha_i e^{\frac{-\|s_i - z_n\|^2}{2\sigma^2}}}. \qquad \text{Eq. (8)}$$

For application of a reduced-set method employing a polynomial function, the kernel may look like the following:

$$K(x_i, x_j) = (\alpha x_i x_j - c_0)^n. \qquad (9)$$

The Burges reduced-set vector method (BRSM or BRSVM), which is valid for second-order homogenous kernels, is given as:

$$K(x_i, x_j) = (\alpha x_i x_j)^2. \qquad (10)$$

In applying the BRSM, the new $S_{\mu\nu}$ matrix is calculated according to the following:

$$S_{\mu\nu} \equiv \sum_{i=1}^{N_s} \alpha_i y_i s_{i\mu} s_{i\nu}, \qquad \text{Eq. (11)}$$

where:
(a) $s_{i\mu}$ is the matrix of SVs and contains those SVs as rows;
(b) i is the matrix row index; and
(c) $\mu$ is the matrix column index, which is the equivalent of the index of the attributes in the SVs.

Thereafter, $S_{\mu\nu}$ undergo eigenvalue decomposition. For an $S_{\mu\nu}$ having $N_z$ eigenvalues, $N_z$ generally will be equal to the feature vector size. The eigenvectors $z_i$ of $S_{\mu\nu}$ will become the RS vectors. RS vectors can exchange the original SVs and generate the same hyperplane like the original hyperplane. Supposing that $\lambda_i$ are the eigenvalues, the weighting factors for the reduced-set method can be calculated as:

$$\alpha_i^{RedSet} = \frac{\lambda_i}{\|z_i\|^2}. \qquad \text{Eq. (12)}$$

In the BRSM, if the quantity of new RS vectors is equal to the dimension of the feature vector, then the RS vectors will emulate exactly (or otherwise within a given tolerance) the original classification hyperplane. As such, the quantity of SVs can be reduced to the size of the feature vector, resulting in an increase in classification speed with no (or otherwise minimal) degradation of classification performance, in accordance with some embodiments.

Figure 4A:
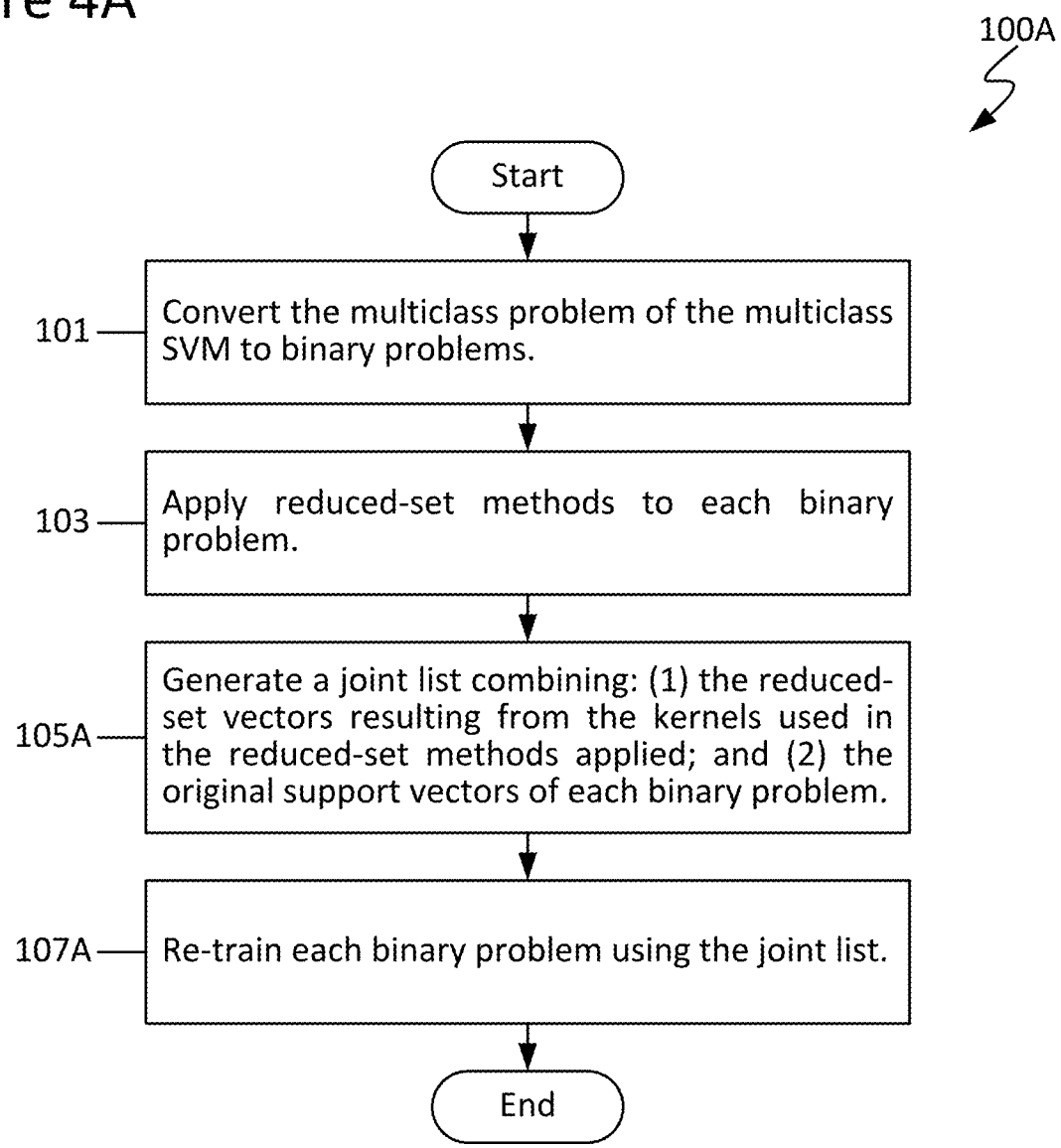
FIG. 4A is a flow diagram illustrating a process of improving the classification performance of a multiclass SVM, in accordance with an embodiment of the present disclosure.

FIG. 4A is a flow diagram illustrating a process 100A of improving the classification performance of a multiclass SVM, in accordance with an embodiment of the present disclosure. As can be seen, the process 100A may begin as in block 101 with converting the multiclass problem of a given multiclass SVM to binary problems. In a multiclass SVM, the multiclass problem may be solved by cascading to binary solutions. To such end, the multiclass SVM may undergo, for example, one-vs.-all (OvA; one-against-all; one-against-rest) reduction or one-vs.-one (OvO; one-against-one) reduction. Other suitable binary conversion methods will depend on a given application and will be apparent in light of this disclosure.

The process 100A may continue as in block 103 with applying one or more reduced-set methods to each binary problem. Thus, a multiclass SVM can be considered, in a general sense, a combination of multiple reduced-set methods. In accordance with some embodiments, both the BRSM and the GRSM (discussed above) may be applied. In such cases, a polynomial kernel and a Gaussian kernel, such as the Gaussian radial basis function (RBF), may be applied. Other suitable reduced-set methods (and associated kernels) will depend on a given application and will be apparent in light of this disclosure.

The process 100A may continue as in block 105A with generating a joint list that combines: (1) the reduced-set (RS) vectors resulting from the kernels used in the reduced-set methods applied; and (2) the original support vectors (SVs) of each binary problem. In cases in which the BRSM and the GRSM are applied, for instance, the joint list may contain the RS vectors resulting from both the applied polynomial and Gaussian kernels. The process 100A may continue as in block 107A with re-training each binary problem using the joint list. In accordance with some embodiments, each binary problem may be re-trained using the joint list by applying a reduction factor (RF) parameter that reduces the quantity of RS vectors. The particular RF parameter to be applied may be selected, in part or in whole, based on the particular SVM performance enhancement to be achieved. For instance, some RF parameters may serve to control classification time, whereas others may serve to control classification accuracy, priority, or other classification performance. In some instances, a given RF parameter may give priority to one or more binary problems as compared to other binary problem(s). In some other instances, a given RF parameter may give priority to one or more kernel methods as compared to other kernel method(s). In some other instances, a given RF parameter may control which RS vector(s) from the different binary problem(s) and which original SV(s) will enter a given joint list. In some other instances, after re-training, a given RF parameter may control which re-trained vector(s) will participate in the final decision(s). In some cases, a given RF parameter may provide a combination of any one or more of the aforementioned (e.g., may be considered multipurpose). Numerous suitable RF parameters will be apparent in light of this disclosure and selection may be customized, as desired for a given target application or end-use. In any case, reduction via the RF parameter(s) may be performed until the multiclass SVM classification performance desired for a given target application or end-use is achieved.

As will be appreciated in light of this disclosure, each binary problem may contain much more than before the vectors, because they are composed from the joint list from the different binary problems. The vectors may be known, and it may be desirable to obtain b and α parameters for each individual decision boundary. To minimize (or otherwise reduce) the error between the hyperplanes of the original SVs and RS vectors given by Eq. (5) above, the derivate may be forced to equal zero. Thus, the α weighting parameters may be calculated as:

$$\alpha^{new} = \alpha^{old} K_{xz} K_{zz}^{-1}.$$ Eq. (13)

Therefore, in accordance with some embodiments, the kernel for the re-training in block 107A can be calculated, in accordance with some embodiments, as:

$$K = K_{xz} \cdot K_{zz}^{-1} \cdot K_{xz}^{T},$$ Eq. (14)

where $K_{xz} = K(x,z)$ is the kernel function between the original and new vector lists.

Figure 4B:
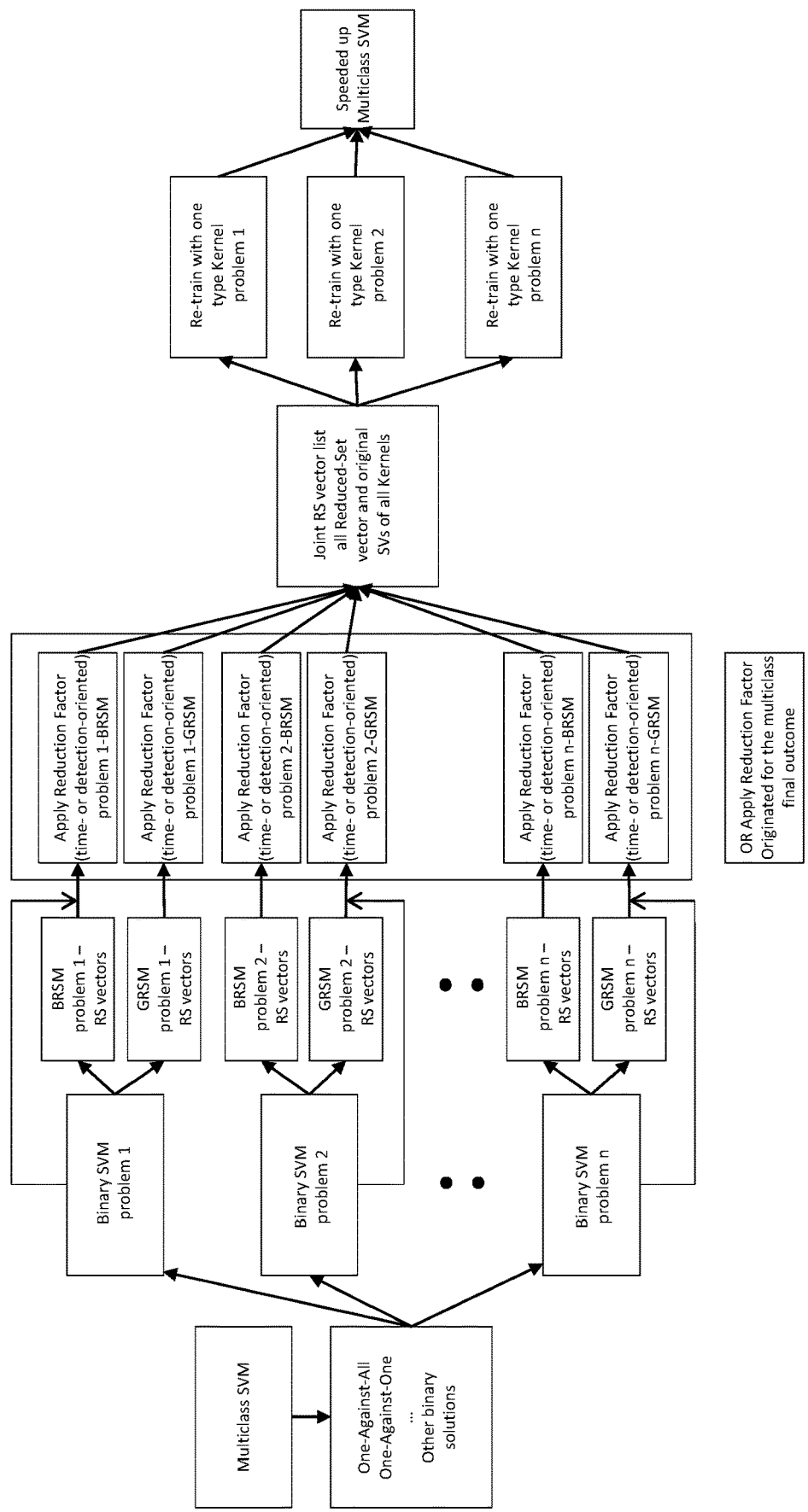
FIG. 4B is a flow diagram illustrating an example case of speeding up a multiclass SVM with a single joint list, in accordance with an embodiment of the present disclosure.

FIG. 4B is a flow diagram illustrating an example case of speeding up a multiclass SVM with a single joint list, in accordance with an embodiment of the present disclosure. Here, the flow begins with training a multiclass SVM using one-against-all, one-against-one, or any other suitable binary conversion method. The resultant binary SVM solutions are then reduced with reduced-set methods, such as the BRSM and the GRSM. A combined joint list is created, and all RS vectors are entered therein, along with the original SVs for all binary problems. All binary problems are then re-trained using that joint list. In this re-training phase, one of the kernels of the applied reduced-set methods is used. Here, either the polynomial kernel of the BRSM or the Gaussian kernel of the GRSM may be used. It should be noted, however, that although the flow of FIG. 4B is demonstrated only for two example kernel functions (Gaussian and polynomial), the present disclosure is not so limited, as in a more general sense, any type of kernel may be used, in accordance with other embodiments. Thereafter, a reduction factor (RF) parameter is introduced to re-train. In some instances, the same RF parameter can be applied for all binary classes, whereas in some other instances, different RF parameters may be applied (e.g., giving more importance to some classes over others). A given RF parameter can be selected, in accordance with some embodiments, based on a given classification speed or a given level of classification performance (e.g., detection precision) or a given class prioritization to be achieved for a given target application or end-use. Different reductions of the final joint list may be applied for the different initial binary problems, in some cases.

Reduction may be stopped, for instance, when the performance desired for a given target application or end-use is achieved. In accordance with some embodiments, the reduction of vectors can be performed, as described herein, and variations in (e.g., degradation of) the detection vs. false positive rate may be observed. This can be done for each individual binary problem separately or by observing the final multiclass classification performance, in accordance with some embodiments. In some cases, the RF parameter can be selected in a manner such that it gives greater priority to the joint list resulting from some kernel, for example, if that particular kernel is observed as yielding better classifications results (e.g., improved classification performance) for a given case. If the BRSM is used in reducing to the size of the feature vector, then the resultant performance may be like it was in the case of the original SVs. If desired, the quantity of SVs can be further reduced by limiting ones with high weighting factor (e.g., having a weighting factor greater than or equal to a given threshold value, which may be any standard, custom, or user-defined value), in accordance with an embodiment. In the case of the GRSM, the vectors having smaller $\alpha^{RedSet}_i$ may be removed, as they have less contribution to the final testing function.

Figure 5A:
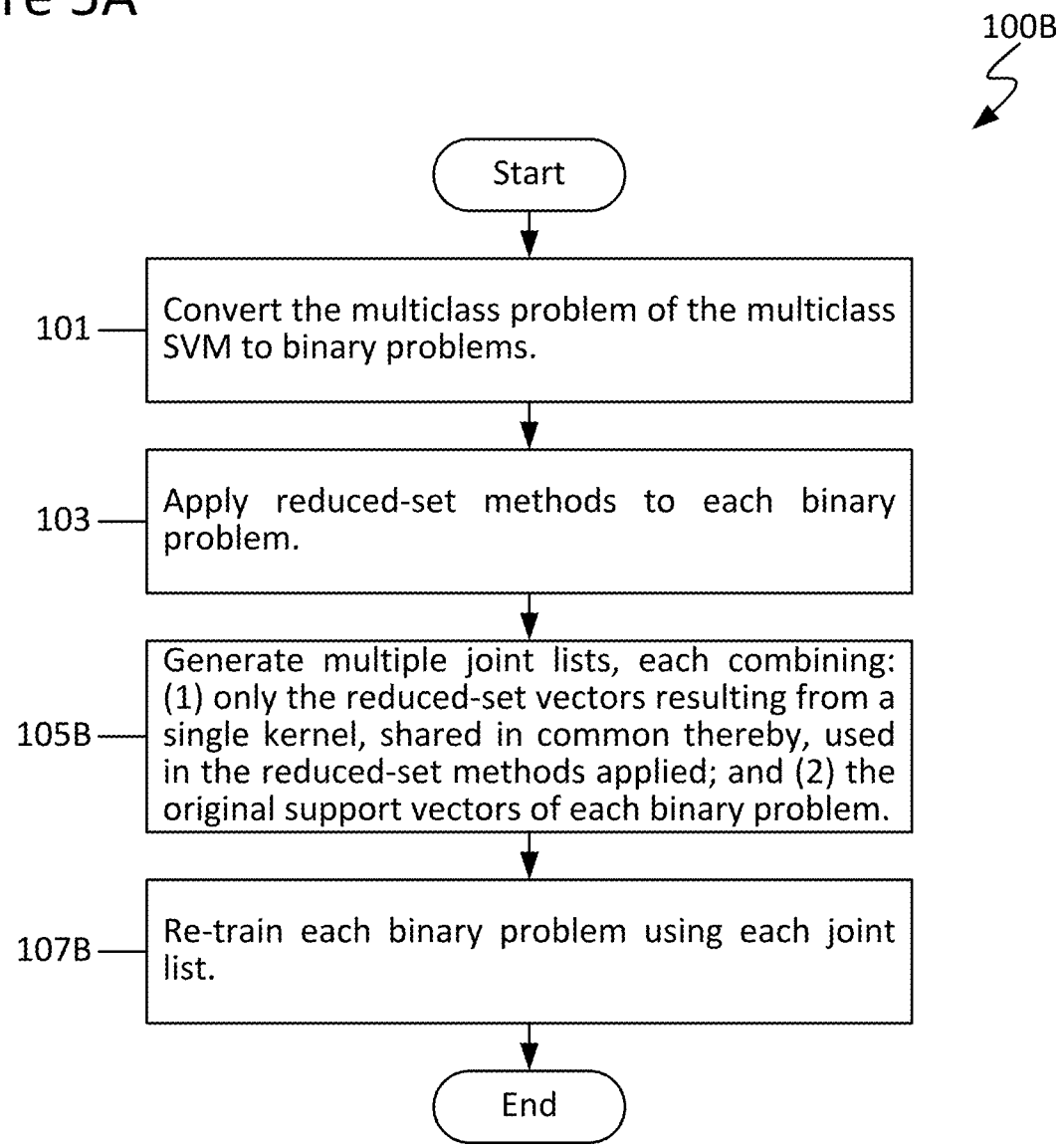
FIG. 5A is a flow diagram illustrating a process of improving the classification performance of a multiclass SVM, in accordance with another embodiment of the present disclosure.

FIG. 5A is a flow diagram illustrating a process 100B of improving the classification performance of a multiclass SVM, in accordance with another embodiment of the present disclosure. As can be seen, the process 100B may begin as in blocks 101 and 103, which may be performed in substantially the same manner as discussed above, for instance, with respect to the process 100A of FIGS. 4A-4B, in accordance with some embodiments. The process 100B may continue as in block 105B with generating multiple joint lists, each combining: (1) only the reduced-set (RS) vectors resulting from a single kernel, shared in common thereby, used in the reduced-set methods applied; and (2) the original support vectors (SVs) of each binary problem. In accordance with an embodiment, only the RS vectors corresponding to the same kernel function are combined in a given joint list. Thus, if the BRSM and the GRSM are used, for instance, then there may be two joint lists, one for the polynomial kernel (of the BRSM) and one for the Gaussian kernel (of the GRSM) applied. Additional or different joint lists may be provided based on other kernels applied, in accordance with other embodiments. The process 100B may continue as in block 107B with re-training each binary problem using each joint list. In accordance with some embodiments, each binary problem may be re-trained by applying a reduction factor (RF) parameter that the quantity of RS vectors. As will be appreciated in light of this disclosure, the discussion of RF parameters provided above with reference to block 107A of FIG. 4A applies equally as well here in the context of block 107B of FIG. 5A, in accordance with some embodiments. In any case, reduction via the RF parameter(s) may be performed until the multiclass SVM classification performance desired for a given target application or end-use is achieved.

Figure 5B:
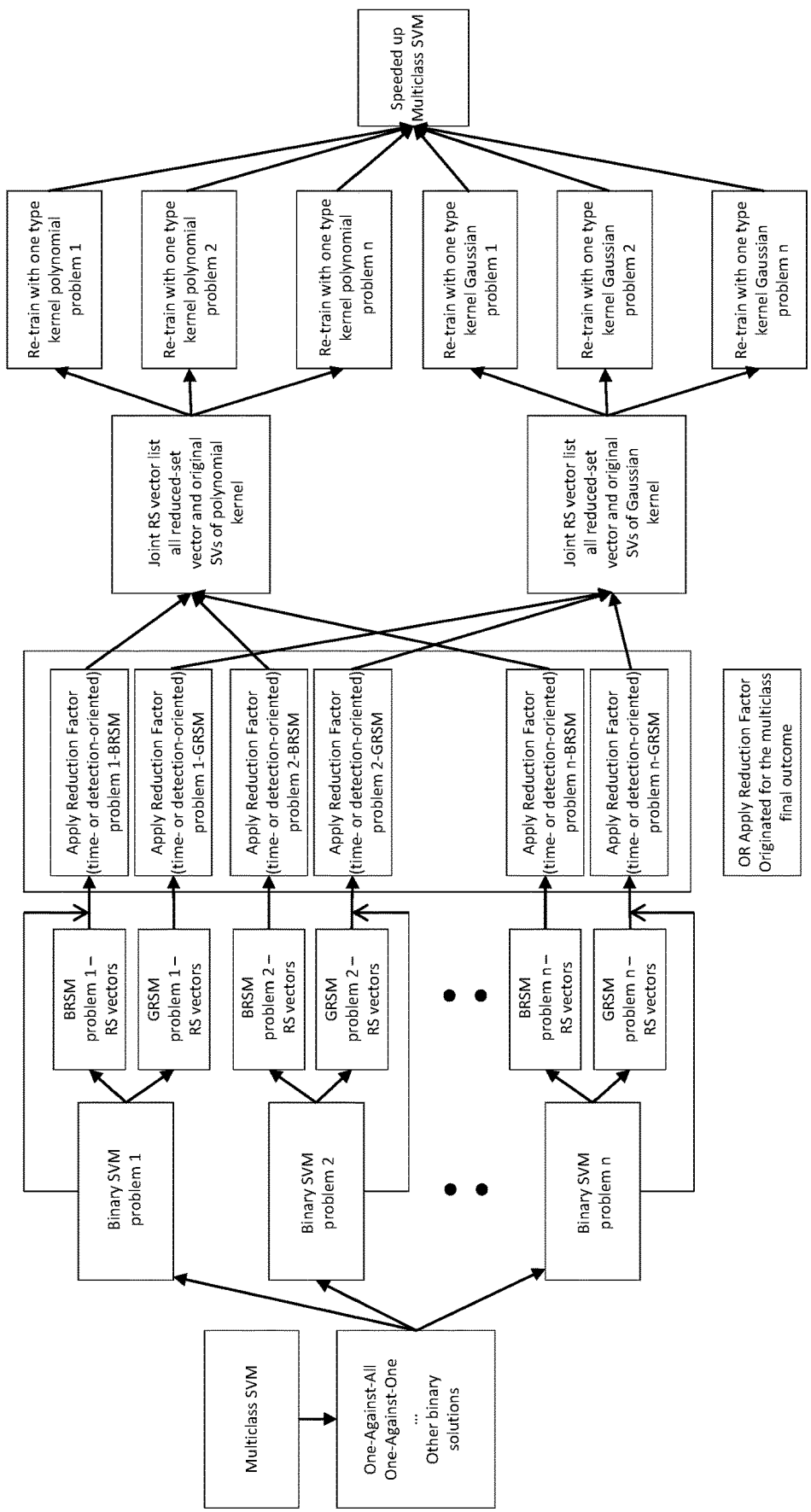
FIG. 5B is a flow diagram illustrating an example case of speeding up a multiclass SVM with multiple joint lists, in accordance with an embodiment of the present disclosure.

FIG. 5B is a flow diagram illustrating an example case of speeding up a multiclass SVM with multiple joint lists, in accordance with an embodiment of the present disclosure. Here, the flow begins with training a multiclass SVM using one-against-all, one-against-one, or any other suitable binary conversion method. The resultant binary SVM solutions are then reduced with reduced-set methods, such as the BRSM and the GRSM. Multiple joint lists are created, each joint list corresponding to a single reduced-set kernel used. In each such joint list, all RS vectors resulting from a single kernel are entered therein, along with the original SVs for all binary problems. All binary problems are then re-trained using each joint list. In this re-training phase, all of the kernel functions are used, and the decision function will have the combination of the different kernel functions. It should be noted, however, that although the flow of FIG. 5B is demonstrated only for two example kernel functions (Gaussian and polynomial), the present disclosure is not so limited, as in a more general sense, any type of kernel may be used, in accordance with other embodiments. Thereafter, a reduction factor (RF) parameter is introduced to re-train. Here, different kernels are combined in a different way (e.g., as compared to FIGS. 4A-4B), and there is additional freedom of the RF parameter to apply it in the combination phase. Reduction may be stopped, for instance, when the performance desired for a given target application or end-use is achieved.

In accordance with some embodiments, the process flows of FIGS. 4A-4B and 5A-5B can be used, for example, to enhance classification speed, classification performance (e.g., class detection), or both, in the testing phase for multiclass cases, binary cases, or both. Numerous variations on the processes for FIGS. 4A-4B and 5A-5B will be apparent in light of this disclosure. As will be appreciated, and in accordance with an embodiment, each of the functional boxes (e.g., 101, 103, 105A, 105B, 107A, 107B) shown in those figures can be implemented, for example, as a module or sub-module that, when executed by one or more processors (e.g., such as a processor 610, discussed below) or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.). Depending on the task and time permitted to achieve a given classification, implementations in any one, or combination, of hardware, software, and firmware are possible. In accordance with some embodiments, techniques described herein can be performed, in part or in whole, for example, via a field-programmable gate array (FPGA) or a graphics accelerator, among others.

In binary cases where the BRSM is applied, the quantity of SVs can be reduced, in accordance with some embodiments, to the size of the feature vector (i.e., the quantity of attributes in the feature vector). For instance, if the model file has 10,000 SVs, and the feature vector has a size of 100 attributes, then the BRSM may be used to reduce the quantity of SVs to 100. As will be appreciated in light of this disclosure, the classification time for an SVM in the testing phase is linearly proportional to the quantity of SVs. Thus, for this particular example case, the SVM may be speeded up by a factor of 100 (=number_of_SVs/feature_vector_size=10,000/100). If the model file instead has 8,000 SVs, and the feature vector has a size of 100 attributes, then the SVM may be speeded up by a factor of 80 (=number_of_SVs/feature_vector_size=8,000/100). In some cases, such as for homogeneous polynomials, for instance, this speeding up may be performed with no (or otherwise negligible) degradation to classification performance, in accordance with an embodiment.

In multiclass cases where the BRSM is applied, calculation of the speed-up factor for the SVM may be analytically more complex. For instance, consider the case of an n-class multiclass problem. Conversion of the multiclass SVM via a one-against-one (OvO) method yields n*(n−1)/2 binary problems, whereas conversion via a one-against-all (OvA) method yields n binary problems. In applying the BRSM, one might suppose that the speeding-up factor would be equal to number_of_SVs/feature_vector_size, as with the binary case discussed above. However, it actually may be less, because in one-against-one and one-against-all cases, the binary problems can share some SVs. Therefore, in the speed-up factor calculation, the kernel factor for the particular SV may be calculated only once, and the time may be reduced accordingly. As will be appreciated in light of this disclosure, the quantity of shared SVs may depend on the training process. Thus, depending on the particular task, the speeding-up factor for a multiclass SVM (e.g., with three or more classes) may be in the range of 20-50 (e.g., 20-30, 30-40, 40-50, or any other sub-range in the range of 20-50), in accordance with some embodiments. In calculating the speed-up factor for SVM multiclass cases where the GRSM is applied, it may be desirable to take into account use of the GRSM or other kernel function that is a mixture of kernel functions. As will be further appreciated in light of this disclosure, the combination with other kernels and re-training of the different joint lists may improve freedom and reliability in SVM multiclass implementations, in accordance with some embodiments.

The completion of training (or re-training) of an SVM normally yields a model file. The model file may contain SVs as well as parameters such as, for example, the quantity of SVs for each class and the weighting factors for the SVs, among others. In the testing phase of an SVM, the model file may be read (e.g., by a processor, such as a processor 610, discussed below), and a decision like that described above with respect to Eq. (1) may be performed. If there are multiple class (e.g., three or more classes), then several such decisions may be performed.

In accordance with an embodiment, the vectors of a model file produced upon completion of training (or re-training) of an SVM can be written into memory (e.g., such as memory 612, discussed below). The memory can be of any suitable type, such as, for example, random-access memory (RAM), read-only memory (ROM), or a combination thereof, among others. The memory can be implemented with any one, or combination, of volatile and non-volatile memory and may be of any size, as desired for a given target application or end-use. In some cases, the memory may be configured for use in storing, on a temporary or permanent basis, applications, media, programs, content, or a combination thereof. In some instances, the memory may be configured for use as processor workspace for one or more processors. In accordance with some embodiments, the memory may have stored therein or otherwise have access to one or more modules, which can be accessed and executed by one or more processors. For example, in some cases, the memory may have stored therein or otherwise have access to one or more applications. A given module of the memory may be implemented in any suitable standard, custom, or proprietary programming language, such as, for example, C, C++, objective C, or JavaScript, among others. In accordance with some embodiments, the module(s) of the memory can be encoded, for example, on a computer-readable medium that, when executed by a processor, carries out any one or more of the functions described herein, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, a given functional module of the memory can be implemented in hardware, software, firmware, or a combination thereof, as desired for a given target application or end-use. Other suitable configurations for the memory and the modules, applications, and data thereof will depend on a given application and will be apparent in light of this disclosure.

Example System

Figure 6:
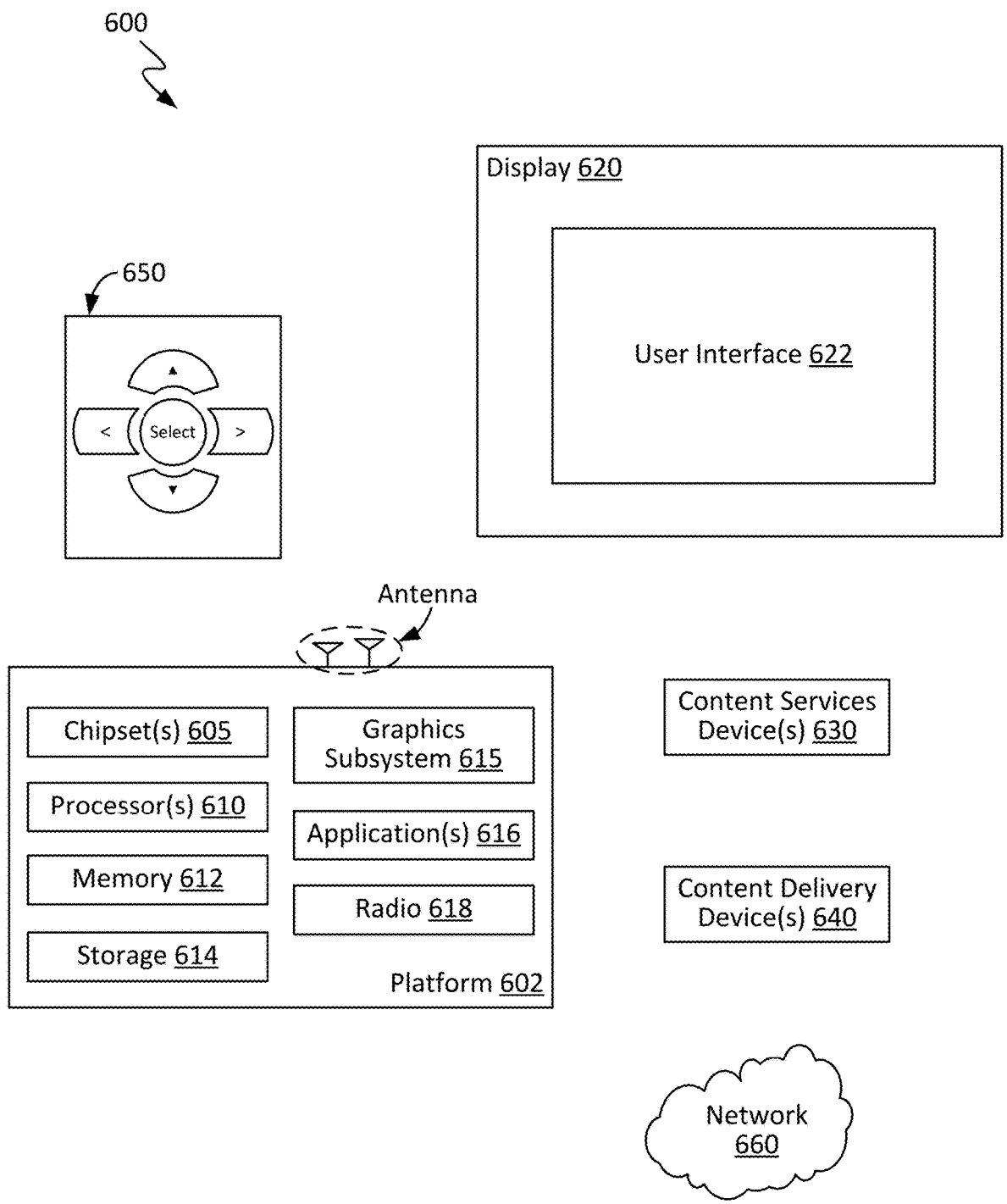
FIG. 6 illustrates an example system that may carry out the techniques for improving the classification performance of a multiclass SVM as described herein, in accordance with some embodiments.

FIG. 6 illustrates an example system 600 that may carry out the techniques for improving the classification performance of a multiclass SVM as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction-set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for improving the classification performance of a multiclass SVM described herein may be implemented in various hardware architectures. For example, the techniques for improving the classification performance of a multiclass SVM as provided herein may be integrated within a graphics and/or video chipset. Alternatively, a discrete security processor may be used. In still another embodiment, the graphics and/or video functions including the techniques for improving the classification performance of a multiclass SVM may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for improving the classification performance of a multiclass SVM as described herein). The embodiments, however, are not limited to the elements or context shown or described in FIG. 6.

Figure 7:
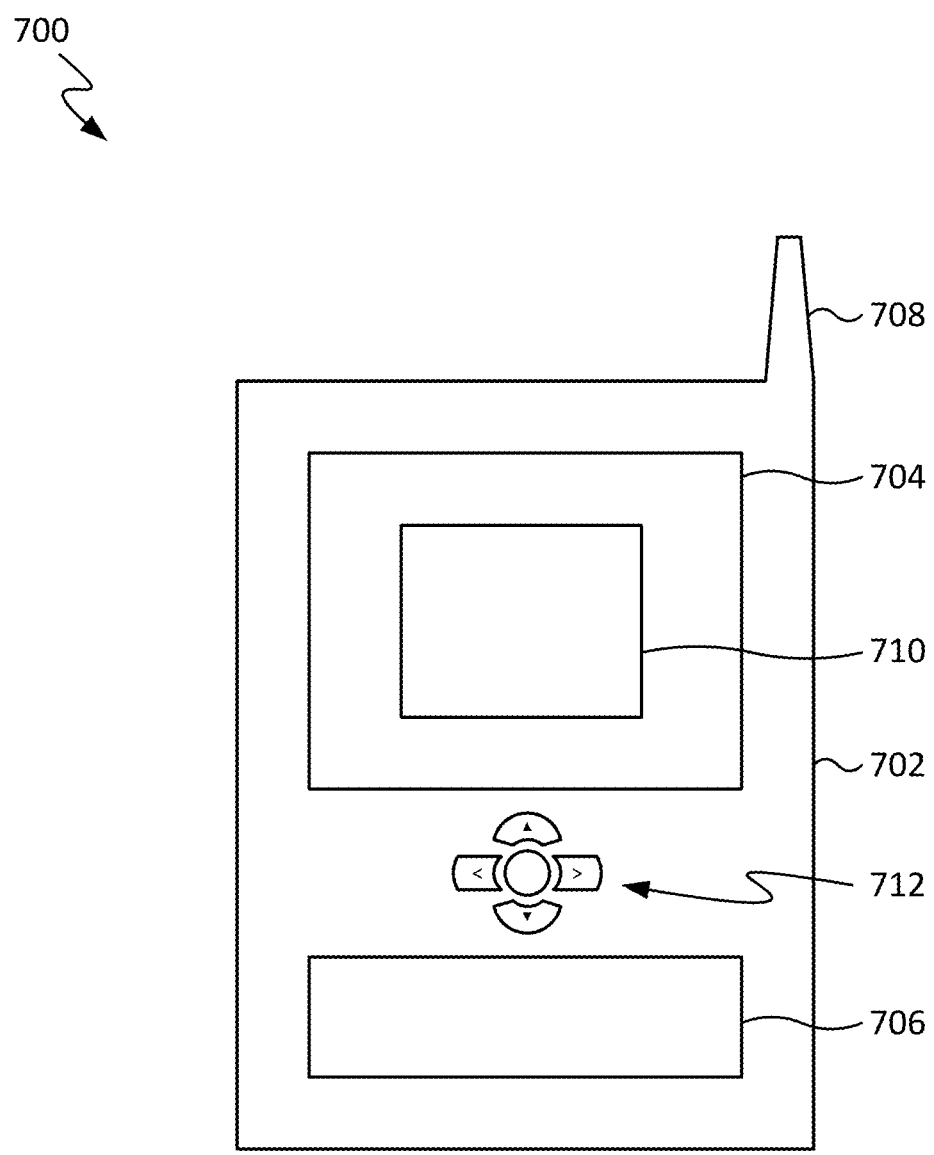
FIG. 7 illustrates embodiments of a small form factor device in which the system of FIG. 6 may be embodied.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 may include a user interface (UI) 710. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

FURTHER EXAMPLE EMBODIMENTS

The following examples pertain to further embodiments, from which numerous permutations and configurations will be apparent.

Example 1 is a computing system including: at least one memory; and at least one processor configured to access the at least one memory and to: convert a multiclass problem of a support vector machine (SVM) to at least one binary problem; reduce the at least one binary problem via at least one reduced-set method; generate at least one joint list including: at least one reduced-set (RS) vector resulting from reduction of the at least one binary problem; and at least one original support vector (SV) of the at least one binary problem; and re-train the at least one binary problem with the at least one joint list. Variations will be apparent in light of this disclosure; for instance, in another case, a processor is provided, the processor being configured to: convert a multiclass problem of a support vector machine (SVM) to at least one binary problem; reduce the at least one binary problem via at least one reduced-set method; generate at least one joint list including: at least one reduced-set (RS) vector resulting from reduction of the at least one binary problem; and at least one original support vector (SV) of the at least one binary problem; and re-train the at least one binary problem with the at least one joint list.

Example 2 includes the subject matter of any of Examples 1 and 3-20, wherein the at least one reduced-set method includes at least one of Burges reduced-set vector method (BRSM) and a Gaussian reduced-set vector method (GRSM).

Example 3 includes the subject matter of any of Examples 1-2 and 4-20, wherein the at least one reduced-set method applies at least one of a polynomial function and a Gaussian radial basis function (RBF).

Example 4 includes the subject matter of any of Examples 1-3 and 5-20, wherein the at least one joint list is a single joint list.

Example 5 includes the subject matter of any of Examples 1-4 and 6-20, wherein: the at least one reduced-set method is a plurality of reduced-set methods; and the at least one joint list is a single joint list generated based on a single kernel function of the plurality of reduced-set methods.

Example 6 includes the subject matter of Example 5, wherein the kernel function is at least one of a polynomial function and a Gaussian function.

Example 7 includes the subject matter of Example 5, wherein the kernel function is a user-defined function.

Example 8 includes the subject matter of any of Examples 1-7 and 9-20, wherein the at least one joint list is a plurality of joint lists.

Example 9 includes the subject matter of any of Examples 1-8 and 10-20, wherein: the at least one reduced-set method is a plurality of reduced-set methods; and the at least one joint list is a plurality of joint lists including at least: a first joint list generated based on a first kernel function of the plurality of reduced-set methods; and a second joint list generated based on a second kernel function of the plurality of reduced-set methods.

Example 10 includes the subject matter of Example 9, wherein: the first kernel function is a polynomial function; and the second kernel function is a Gaussian function.

Example 11 includes the subject matter of Example 9, wherein at least one of the first and second kernel functions is a user-defined function.

Example 12 includes the subject matter of any of Examples 1-11 and 13-20, wherein in re-training the at least one binary problem with the at least one joint list, the at least one processor is configured to apply at least one reduction factor (RF) parameter to reduce a quantity of the at least one RS vector.

Example 13 includes the subject matter of Example 12, wherein the at least one RF parameter is a single RF parameter and is applied to each of the at least one binary problem.

Example 14 includes the subject matter of Example 12, wherein the at least one RF parameter is a plurality of RF parameters.

Example 15 includes the subject matter of Example 12, wherein the at least one RF parameter improves at least one of classification time and classification performance of the SVM.

Example 16 includes the subject matter of Example 12, wherein: the at least one joint list is a plurality of joint lists; and the at least one RF parameter gives priority to a given joint list over another.

Example 17 includes the subject matter of any of Examples 1-16 and 18-20, wherein in re-training the at least one binary problem with the at least one joint list, the at least one processor is further configured to reduce a quantity of the at least one original SV based on a weighting factor.

Example 18 includes the subject matter of any of Examples 1-17 and 19-20, wherein in converting the multiclass problem of the SVM to at least one binary problem, the at least one processor is configured to apply at least one of one-vs.-all reduction and one-vs.-one reduction.

Example 19 includes the subject matter of any of Examples 1-18, wherein the multiclass SVM has two classes.

Example 20 includes the subject matter of any of Examples 1-18, wherein the multiclass SVM has three or more classes.

Example 21 is a non-transitory computer program product including a plurality of instructions non-transiently encoded thereon that, when executed by one or more processors, cause a process to be carried out. The computer program product may include one or more computer-readable media, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: converting a multiclass problem of a support vector machine (SVM) to at least one binary problem; reducing the at least one binary problem via at least one reduced-set method; generating at least one joint list including: at least one reduced-set (RS) vector resulting from reduction of the at least one binary problem; and at least one original support vector (SV) of the at least one binary problem; and re-training the at least one binary problem with the at least one joint list.

Example 22 includes the subject matter of any of Examples 21 and 23-40, wherein the at least one reduced-set method includes at least one of Burges reduced-set vector method (BRSM) and a Gaussian reduced-set vector method (GRSM).

Example 23 includes the subject matter of any of Examples 21-22 and 24-40, wherein the at least one reduced-set method applies at least one of a polynomial function and a Gaussian radial basis function (RBF).

Example 24 includes the subject matter of any of Examples 21-23 and 25-40, wherein the at least one joint list is a single joint list.

Example 25 includes the subject matter of any of Examples 21-24 and 26-40, wherein: the at least one reduced-set method is a plurality of reduced-set methods; and the at least one joint list is a single joint list generated based on a single kernel function of the plurality of reduced-set methods.

Example 26 includes the subject matter of Example 25, wherein the kernel function is at least one of a polynomial function and a Gaussian function.

Example 27 includes the subject matter of Example 25, wherein the kernel function is a user-defined function.

Example 28 includes the subject matter of any of Examples 21-27 and 29-40, wherein the at least one joint list is a plurality of joint lists.

Example 29 includes the subject matter of any of Examples 21-28 and 30-40, wherein: the at least one reduced-set method is a plurality of reduced-set methods; and the at least one joint list is a plurality of joint lists including at least: a first joint list generated based on a first kernel function of the plurality of reduced-set methods; and a second joint list generated based on a second kernel function of the plurality of reduced-set methods.

Example 30 includes the subject matter of Example 29, wherein: the first kernel function is a polynomial function; and the second kernel function is a Gaussian function.

Example 31 includes the subject matter of Example 29, wherein at least one of the first and second kernel functions is a user-defined function.

Example 32 includes the subject matter of any of Examples 21-31 and 33-40, wherein re-training the at least one binary problem with the at least one joint list includes: applying at least one reduction factor (RF) parameter to reduce a quantity of the at least one RS vector.

Example 33 includes the subject matter of Example 32, wherein the at least one RF parameter is a single RF parameter and is applied to each of the at least one binary problem.

Example 34 includes the subject matter of Example 32, wherein the at least one RF parameter is a plurality of RF parameters.

Example 35 includes the subject matter of Example 32, wherein the at least one RF parameter improves at least one of classification time and classification performance of the SVM.

Example 36 includes the subject matter of Example 32, wherein: the at least one joint list is a plurality of joint lists; and the at least one RF parameter gives priority to a given joint list over another.

Example 37 includes the subject matter of any of Examples 21-36 and 38-40, wherein re-training the at least one binary problem with the at least one joint list includes: reducing a quantity of the at least one original SV based on a weighting factor.

Example 38 includes the subject matter of any of Examples 21-37 and 39-40, wherein converting the multi-class problem of the SVM to at least one binary problem includes: applying at least one of one-vs.-all reduction and one-vs.-one reduction.

Example 39 includes the subject matter of any of Examples 21-38, wherein the multiclass SVM has two classes.

Example 40 includes the subject matter of any of Examples 21-38, wherein the multiclass SVM has three or more classes.

Example 41 is a method of improving classification performance of a multiclass support vector machine (SVM), the method including: converting a multiclass problem of a support vector machine (SVM) to at least one binary problem; reducing the at least one binary problem via at least one reduced-set method; generating at least one joint list including: at least one reduced-set (RS) vector resulting from reduction of the at least one binary problem; and at least one original support vector (SV) of the at least one binary problem; and re-training the at least one binary problem with the at least one joint list.

Example 42 includes the subject matter of any of Examples 41 and 43-60, wherein the at least one reduced-set method includes at least one of Burges reduced-set vector method (BRSM) and a Gaussian reduced-set vector method (GRSM).

Example 43 includes the subject matter of any of Examples 41-42 and 44-60, wherein the at least one reduced-set method applies at least one of a polynomial function and a Gaussian radial basis function (RBF).

Example 44 includes the subject matter of any of Examples 41-43 and 45-60, wherein the at least one joint list is a single joint list.

Example 45 includes the subject matter of any of Examples 41-44 and 46-60, wherein: the at least one reduced-set method is a plurality of reduced-set methods; and the at least one joint list is a single joint list generated based on a single kernel function of the plurality of reduced-set methods.

Example 46 includes the subject matter of Example 45, wherein the kernel function is at least one of a polynomial function and a Gaussian function.

Example 47 includes the subject matter of Example 45, wherein the kernel function is a user-defined function.

Example 48 includes the subject matter of any of Examples 41-47 and 49-60, wherein the at least one joint list is a plurality of joint lists.

Example 49 includes the subject matter of any of Examples 41-48 and 50-60, wherein: the at least one reduced-set method is a plurality of reduced-set methods; and the at least one joint list is a plurality of joint lists including at least: a first joint list generated based on a first kernel function of the plurality of reduced-set methods; and a second joint list generated based on a second kernel function of the plurality of reduced-set methods.

Example 50 includes the subject matter of Example 49, wherein: the first kernel function is a polynomial function; and the second kernel function is a Gaussian function.

Example 51 includes the subject matter of Example 49, wherein at least one of the first and second kernel functions is a user-defined function.

Example 52 includes the subject matter of any of Examples 41-51 and 53-60, wherein re-training the at least one binary problem with the at least one joint list includes: applying at least one reduction factor (RF) parameter to reduce a quantity of the at least one RS vector.

Example 53 includes the subject matter of Example 52, wherein the at least one RF parameter is a single RF parameter and is applied to each of the at least one binary problem.

Example 54 includes the subject matter of Example 52, wherein the at least one RF parameter is a plurality of RF parameters.

Example 55 includes the subject matter of Example 52, wherein the at least one RF parameter improves at least one of classification time and classification performance of the SVM.

Example 56 includes the subject matter of Example 52, wherein: the at least one joint list is a plurality of joint lists; and the at least one RF parameter gives priority to a given joint list over another.

Example 57 includes the subject matter of any of Examples 41-56 and 58-60, wherein re-training the at least one binary problem with the at least one joint list includes: reducing a quantity of the at least one original SV based on a weighting factor.

Example 58 includes the subject matter of any of Examples 41-57 and 59-60, wherein converting the multiclass problem of the SVM to at least one binary problem includes: applying at least one of one-vs.-all reduction and one-vs.-one reduction.

Example 59 includes the subject matter of any of Examples 41-58, wherein the multiclass SVM has two classes.

Example 60 includes the subject matter of any of Examples 41-58, wherein the multiclass SVM has three or more classes.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A computing system for improving classification performance of a multiclass support vector machine (SVM), the system comprising:
    at least one memory; and
    at least one processor configured to access the at least one memory and to:
        convert a multiclass problem of an SVM into a plurality of binary problems,
        reduce at least one of the binary problems, in independent manner from others of the plurality of binary problems of the multiclass problem, via at least one reduced-set method,
        generate at least one joint list comprising:
            one or more reduced-set (RS) vectors resulting from reduction of the at least one binary problem, and
            at least one original support vector (SV) of the at least one binary problem,
        select at least one reduction factor (RF) parameter to control one or more of classification time and classification accuracy,
        apply the selected at least one RF parameter to reduce a quantity of the RS vectors, and
        re-train the at least one binary problem with the at least one joint list and based on the applied RF parameter.

2. The computing system of claim 1, wherein the at least one reduced-set method comprises at least one of Burges reduced-set vector method (BRSM) and a Gaussian reduced-set vector method (GRSM).

3. The computing system of claim 1, wherein the at least one reduced-set method applies at least one of a polynomial function and a Gaussian radial basis function (RBF).

4. The computing system of claim 1, wherein:
    the at least one reduced-set method comprises a plurality of reduced-set methods; and
    the at least one joint list is a single joint list generated based on a single kernel function of the plurality of reduced-set methods, wherein the kernel function is at least one of a polynomial function and a Gaussian function.

5. The computing system of claim 1, wherein:
    the at least one reduced-set method comprises a plurality of reduced-set methods; and
    the at least one joint list is a plurality of joint lists including at least
        a first joint list generated based on a first kernel function of the plurality of reduced-set methods, and
        a second joint list generated based on a second kernel function of the plurality of reduced-set methods.

6. The computing system of claim 1, wherein:
    the at least one joint list comprises a plurality of joint lists; and
    the at least one RF parameter gives priority to a given joint list over another.

7. The computing system of claim 1, wherein in re-training the at least one binary problem with the at least one joint list, the at least one processor is further configured to reduce a quantity of the at least one original SV based on a weighting factor.

8. A non-transitory computer-readable media encoded with instructions that, when executed by one or more processors, causes a process to be carried out for improving classification performance of a multiclass support vector machine (SVM), the process comprising:
    converting a multiclass problem of an SVM into a plurality of binary problems;
    reducing at least one of the binary problems, in independent manner from others of the plurality of binary problems of the multiclass problem, via at least one reduced-set method;
    generating at least one joint list comprising:
        one or more reduced-set (RS) vectors resulting from reduction of the at least one binary problem, and
        at least one original support vector (SV) of the at least one binary problem,
    selecting at least one reduction factor (RF) parameter to control one or more of classification time and classification accuracy,
    applying the selected at least one RF parameter to reduce a quantity of the RS vectors, and
    re-training the at least one binary problem with the at least one joint list and based on the applied RF parameter.

9. The non-transitory computer-readable media of claim 8, wherein the at least one reduced-set method comprises at least one of Burges reduced-set vector method (BRSM) and a Gaussian reduced-set vector method (GRSM).

10. The non-transitory computer-readable media of claim 8, wherein the at least one reduced-set method applies at least one of a polynomial function and a Gaussian radial basis function (RBF).

11. The non-transitory computer-readable media of claim 8, wherein:
    the at least one reduced-set method comprises a plurality of reduced-set methods; and
    the at least one joint list is a single joint list generated based on a single kernel function of the plurality of reduced-set methods, wherein the kernel function is at least one of a polynomial function and a Gaussian function.

12. The non-transitory computer-readable media of claim 8, wherein:
    the at least one reduced-set method comprises a plurality of reduced-set methods; and
    the at least one joint list is a plurality of joint lists including at least
        a first joint list generated based on a first kernel function of the plurality of reduced-set methods, and a second joint list generated based on a second kernel function of the plurality of reduced-set methods.

13. The non-transitory computer-readable media of claim 8, wherein:
   the at least one joint list comprises a plurality of joint lists; and
   the at least one RF parameter gives priority to a given joint list over another.

14. The non-transitory computer-readable media of claim 8, wherein re-training the at least one binary problem with the at least one joint list comprises:
   reducing a quantity of the at least one original SV based on a weighting factor.

15. The non-transitory computer-readable media of claim 8, wherein the converting the multiclass problem of the SVM into the plurality of binary problems includes cascading the plurality of binary problems, thereby breaking the multiclass problem up into the plurality of binary problems, and each of a first and a second binary problem of the plurality of binary problems being independently reduced, one from another, via the at least one reduced-set method.

16. A method of improving classification performance of a multiclass support vector machine (SVM), the method comprising:
   converting a multiclass problem of an SVM into a plurality of binary problems;
   reducing at least one of the binary problems, in independent manner from others of the plurality of binary problems of the multiclass problem, via at least one reduced-set method;
   generating at least one joint list comprising:
     one or more reduced-set (RS) vectors resulting from reduction of the at least one binary problem, and
     at least one original support vector (SV) of the at least one binary problem,
   selecting at least one reduction factor (RF) parameter to control one or more of classification time and classification accuracy,
   applying the selected at least one RF parameter to reduce a quantity of the RS vectors, and
   re-training the at least one binary problem with the at least one joint list and based on the applied RF parameter.

17. The method of claim 16, wherein the at least one reduced-set method comprises at least one of Burges reduced-set vector method (BRSM) and a Gaussian reduced-set vector method (GRSM).

18. The method of claim 16, wherein the at least one reduced-set method applies at least one of a polynomial function and a Gaussian radial basis function (RBF).

19. The method of claim 16, wherein:
   the at least one reduced-set method comprises a plurality of reduced-set methods; and
   the at least one joint list is a single joint list generated based on a single kernel function of the plurality of reduced-set methods, wherein the kernel function is at least one of a polynomial function and a Gaussian function.

20. The method of claim 16, wherein:
   the at least one reduced-set method comprises a plurality of reduced-set methods; and
   the at least one joint list is a plurality of joint lists including at least
     a first joint list generated based on a first kernel function of the plurality of reduced-set methods, and
     a second joint list generated based on a second kernel function of the plurality of reduced-set methods.

21. The method of claim 16, wherein:
   the at least one joint list comprises a plurality of joint lists; and
   the at least one RF parameter gives priority to a given joint list over another.

22. The method of claim 16, wherein re-training the at least one binary problem with the at least one joint list comprises:
   reducing a quantity of the at least one original SV based on a weighting factor.

* * * * *